(12) United States Patent
Kobayashi

(10) Patent No.: US 6,935,223 B2
(45) Date of Patent: Aug. 30, 2005

(54) PRESSURE FRYER

(75) Inventor: Toshihiro Kobayashi, Nagoya (JP)

(73) Assignee: Paloma Industries, Limited, Nagoya (JP)

( * ) Notice: Subject to any disclaimer, the term of this patent is extended or adjusted under 35 U.S.C. 154(b) by 40 days.

(21) Appl. No.: 10/753,648

(22) Filed: Jan. 8, 2004

(65) Prior Publication Data

US 2004/0144258 A1 Jul. 29, 2004

(30) Foreign Application Priority Data

Jan. 16, 2003 (JP) ........................................ 2003-008708

(51) Int. Cl.[7] .............................................. A47J 37/12
(52) U.S. Cl. ............................ 99/330; 99/331; 99/332; 99/342; 99/403; 99/408; 126/374.1; 126/391.1; 210/167; 210/DIG. 8
(58) Field of Search ........................... 99/325–334, 337, 99/338, 342, 403–410; 126/391.1, 389.1, 390.1, 378.1, 374.1, 369; 210/167, DIG. 8; 219/492–494, 497, 506, 508, 442, 486, 510, 512; 426/231–233, 438, 519, 523; 431/326.1, 170; 700/90, 99, 85, 300; 340/589; 705/14.16; 709/219, 223, 203, 238

(56) References Cited

U.S. PATENT DOCUMENTS

| | | | |
|---|---|---|---|
| 4,599,990 A | * 7/1986 | Fritzsche et al. | ........ 126/374.1 |
| 4,623,544 A | * 11/1986 | Highnote | .................. 426/233 |
| 4,647,824 A | * 3/1987 | Eichenwald | ................. 318/71 |
| 4,840,287 A | 6/1989 | Brewer et al. | |
| 4,911,068 A | 3/1990 | Koether et al. | |
| 4,928,664 A | * 5/1990 | Nishino et al. | .......... 126/391.1 |
| 4,930,408 A | 6/1990 | King et al. | |
| 4,945,893 A | * 8/1990 | Manchester | .............. 126/391.1 |
| 4,997,101 A | 3/1991 | King et al. | |
| 5,033,368 A | 7/1991 | Brewer | |
| 5,261,322 A | * 11/1993 | Yokoyama et al. | ........... 99/330 |
| 5,297,474 A | * 3/1994 | Tabuchi | ....................... 99/344 |
| 5,402,712 A | 4/1995 | King et al. | |
| 5,404,799 A | * 4/1995 | Bivens | ........................ 99/408 |
| 5,417,851 A | * 5/1995 | Yee | ............................ 210/167 |
| 5,617,777 A | * 4/1997 | Davis et al. | ................... 99/408 |
| 5,680,811 A | * 10/1997 | Highnote et al. | ............. 99/408 |
| 5,731,024 A | * 3/1998 | Bivens | ....................... 426/417 |
| 5,823,097 A | * 10/1998 | Dirck | .......................... 99/408 |
| 5,974,955 A | 11/1999 | King et al. | |
| 6,009,795 A | 1/2000 | Werts | |
| 6,085,640 A | 7/2000 | King | |
| 6,105,488 A | 8/2000 | King et al. | |
| 6,112,646 A | 9/2000 | King et al. | |
| 6,336,395 B1 | 1/2002 | Tiszai | |
| 6,443,051 B1 | 9/2002 | Suzuki | |

* cited by examiner

*Primary Examiner*—Timothy F. Simone
(74) *Attorney, Agent, or Firm*—Burr & Brown

(57) ABSTRACT

A pressure fryer is disclosed wherein desirable pressure cooking can be always realized regardless of the amount of food. A fryer 1 has a cooking container 3. The cooking container 3 has a pressure vent 12 which is connected to a high pressure cylinder 13 filled with carbon dioxide. On the connecting tube between the pressure vent 12 and the high pressure cylinder 13, an electromagnetic valve 14 and a check valve 15 are provided. A lid 7 has a safety valve 16 and a pressure sensor 17. A controller 18 carries out opening/closing control of the safety valve 16 and the pressure electromagnetic valve 14 for supplying carbon dioxide into the cooking container 3 based on pressure therein which is obtained from the pressure sensor 17. As a result, the pressure in the cooking container 3 can be maintained within a predetermined value.

7 Claims, 4 Drawing Sheets

Fuel gas

PRESSURE FRYER

BACKGROUND OF THE INVENTION

This application claims the benefit of Japanese Patent Application Number 2003-8708 filed Jan. 16, 2003, the entirety of which is incorporated by reference.

1. Field of the Invention

This invention relates to a pressure fryer including a cooking container for containing cooking oil capable of being hermetically sealed and a heating means for heating the cooking container so as to cook foods, such as fried chicken or fried potatoes, with pressure.

2. Description of the Related Art

Conventionally, a fryer includes a cooking container for containing cooking oil and a heating means, such as a burner, for heating the cooking-container and a controller serving, as a control means for controlling the operation of the heating means. Further, the operation of the heating means is controlled according to a cooking program stored by the controller, which enables the fryer to cook foods. (For example, please refer to Japanese Patent Unexamined Publication No. 2002-223953A)

Among these conventional fryers, a pressure fryer is known in which a cooking container capable of being hermetically sealed and steam vaporized from moisture generated from foods is kept in the cooking container to cook foods with pressure. Whereby, a cooking time can be shortened and food is cooked desirably.

In such a fryer, applying pressure is fully conducted with sufficient steam generated from moisture of foods when a maximum amount of food is cooked. On the other hand, when a small amount of food is cooked, applying pressure is conducted inadequately due to a lack of steam generated from moisture of foods. Then, in order to replenish the deficiency of steam, supply of steam by heating a container filled with water in the cooking container is often applied. In this case, however, it is difficult to adjust the amount of the steam. Owing to this, cooked foods can be damp because of excessive steam or cooking oil might boil suddenly due to water infusion into the cooking oil.

The object of the present invention is to provide a pressure fryer which can conduct desirable pressure cooking constantly regardless of the amount of food.

SUMMARY OF THE INVENTION

In order to achieve the above object, a first aspect of the present invention provides a pressure fryer, wherein a gas supply means for supplying pressure gas is provided in the cooking container, which enables pressure to be applied to the inside of the cooking container by supplying the pressure gas with steam generated during cooking.

According to a second aspect of the present invention, there is provided a pressure fryer wherein pressure gas is carbon dioxide. As a result, the pressure gas can be easily obtained or maintained.

A third aspect of the present invention provides a pressure fryer further comprising a pressure detecting means for detecting pressure in the cooking container. Pressure gas supply is controlled according to a detected value by the pressure detecting means and/or a rise gradient of the detected value. With this configuration, the pressure gas can be used efficiently.

A fourth aspect of the present invention provides a pressure fryer further comprising a timer means for counting an elapsed time from a start of cooking. An applying pressure time is previously set according to each cooking menu and pressure gas is supplied with the cooking container for the preset pressuring time for the selected cooking menu. As a result, desirable pressure cooking in a simple configuration can be carried out using the pressure gas efficiently.

According to a fifth aspect of the present invention, there is provided a pressure fryer wherein pressure gas supply is controlled according to a detected value by a temperature detecting means and/or a rise gradient of the detected value. As a result, desirable pressure cooking in a simple configuration can be carried out using the pressure gas efficiently.

DETAILED DESCRIPTION OF THE PREFERRED EMBODIMENTS

Hereinafter, preferred embodiments of the present invention will be described with reference to the accompanying drawings.

First Embodiment

Figure 1:
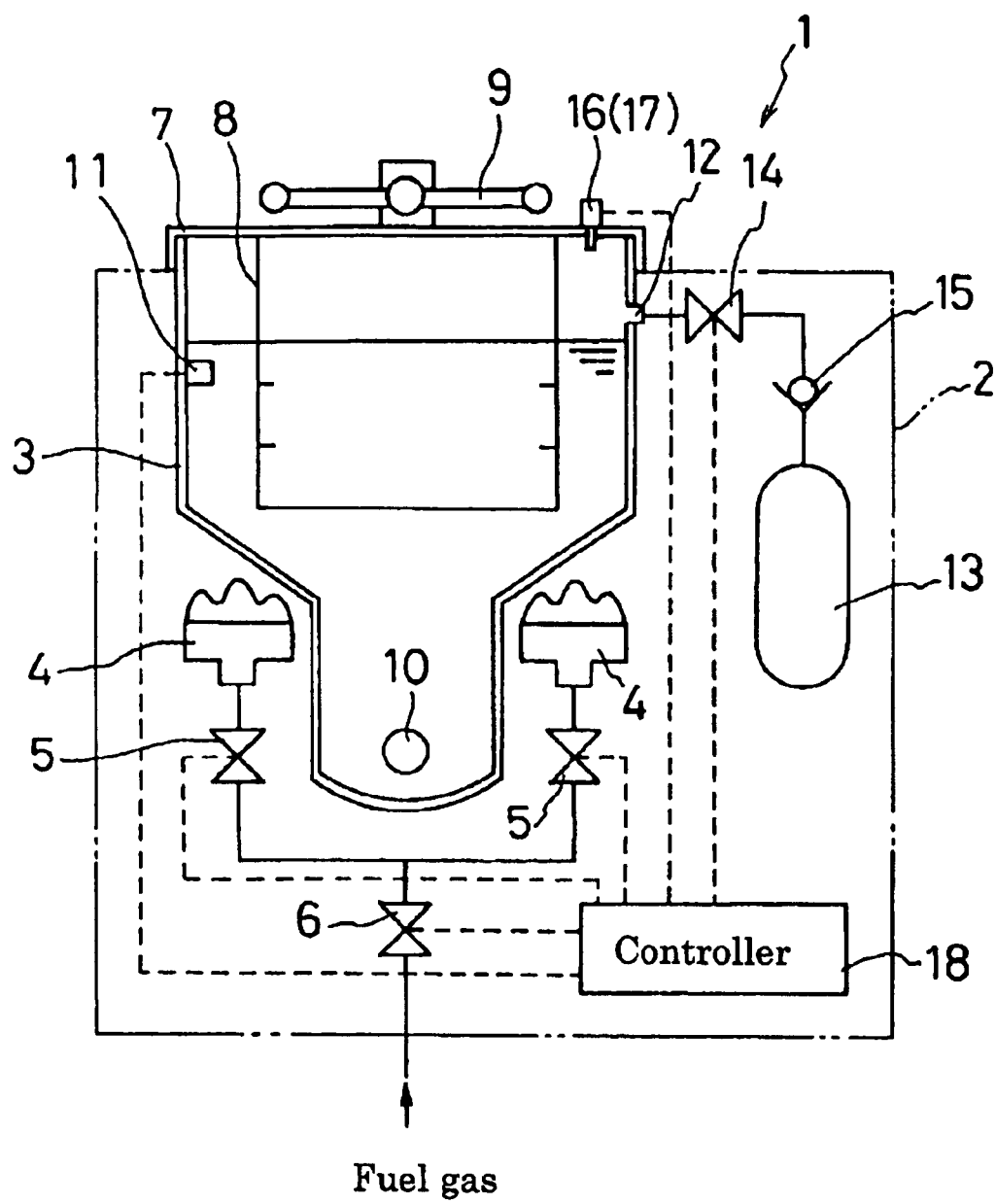
FIG. 1 is a schematic view of a pressure fryer of the present invention.

FIG. 1 shows a schematic view of an embodiment of a pressure fryer. A pressure fryer 1 has a casing 2, which includes a cooking container 3 for containing cooking oil, and burners 4, 4 for heating the cooking container 3 from the bottom, wherein a burner electromagnetic valve 5 is provided with a gas conduit connected with each burner 4, and a main electromagnetic valve 6 is provided with an upstream gas conduit before being forked. On the top of the casing 2, a lid 7 which can hermetically seal an opening of the cooking container 3 is provided movably upward and downward. On the bottom side of the lid 7, a basket 8 where foods can be disposed is hanged to be sunk in the cooking oil in the cooking container 3 with the lid 7 sealed. The reference number 9 indicates a handle to open or close the lid 7, and 10 indicates an oil drain provided on the bottom of the cooking container 3, and 11 indicates an oil temperature sensor serving as an oil temperature detecting means for detecting a temperature of the cooking oil.

The cooking container 3 has a pressure vent 12 which is connected to a high pressure cylinder 13 filled with carbon dioxide. A connecting tube between the pressure vent 12 and the high pressure cylinder 13 has an electromagnetic valve 14 for controlling the carbon dioxide (hereinafter, it is referred to as a pressure electromagnetic valve 14) and a check valve 15. The high pressure cylinder 13 and the pressure electromagnetic valve 14 constitute a gas providing means. The lid 7 also has a safety valve 16 and a pressure sensor 17 as a pressure detecting means.

The reference number 18 indicates a controller serving as a control means. When a cooking menu is selected in an operation portion (not shown) provided on the surface of the casing 2, the controller 18 monitors temperature of the cooking oil obtained by the temperature sensor 11 according to a cooking program previously stored for each cooking menu. Simultaneously, the controller 18 controls opening/closing of the main electromagnetic valve 6 and the burner electromagnetic valve 5 as well as ignition/extinction of the burner 4. In addition, the controller 18 carries out pressure cooking control in the cooking container 3 by opening/closing the safety valve 16 and the pressure electromagnetic valve 14, based on the amount of pressure in the cooking container 3 obtained from the pressure sensor 17 as described below.

Figure 2:
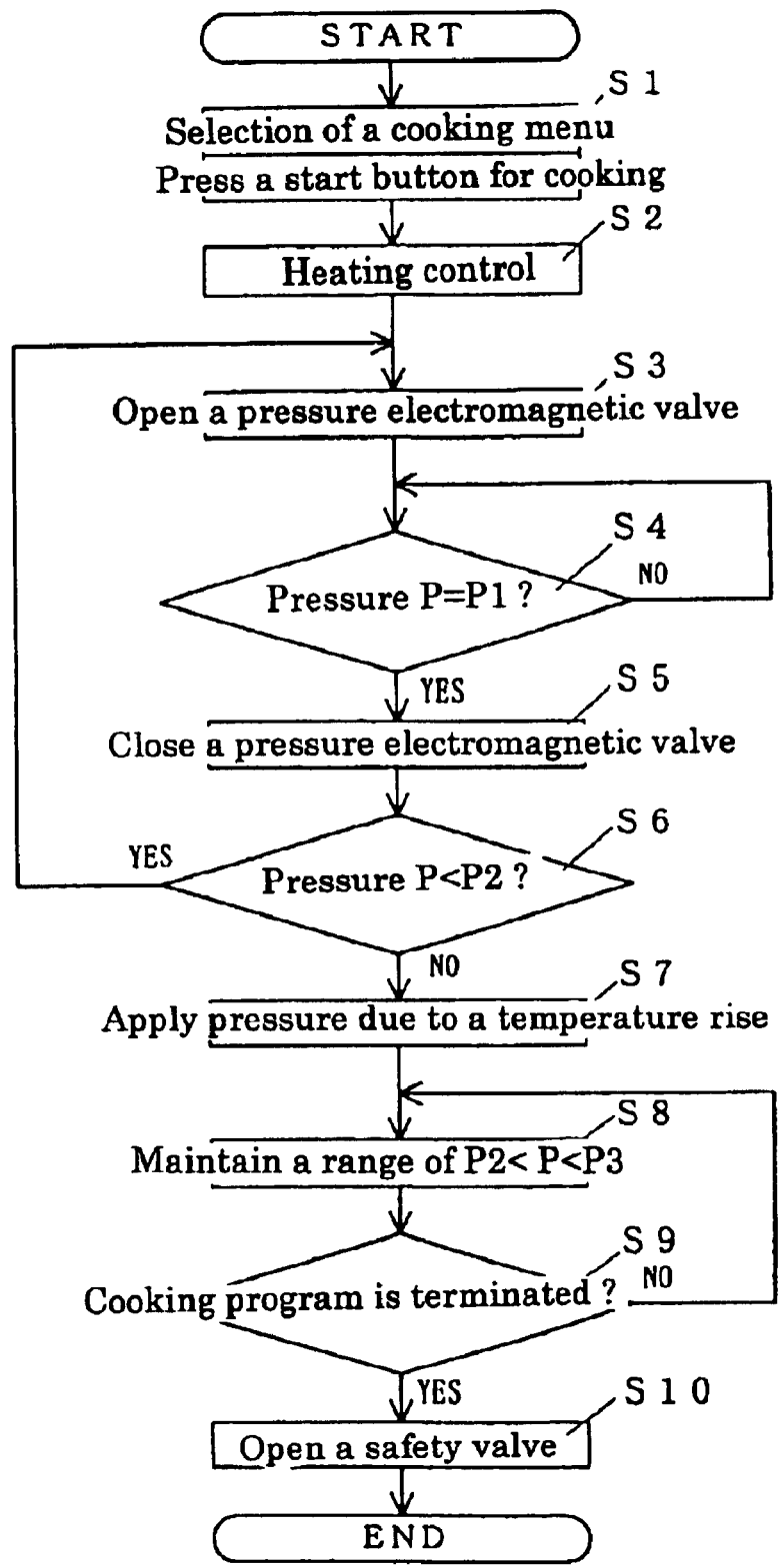
FIG. 2 is a flow chart of pressure cooking control of the first embodiment of the present invention.

FIG. 2 shows a flow chart of the pressure cooking control. First, a certain cooking menu is selected and a start button is pressed at the operation portion at S1. Then, the burner 4 is ignited for starting heating control at S2. When a temperature of the cooking oil reaches a predetermined level, food is put and the lid 7 is closed to carry out a cooking program corresponding to the cooking menu (which is, a control of the amount of heat and combustion time). Next, the pressure electromagnetic valve 14 is opened to supply carbon dioxide from the high pressure cylinder 13 to the cooking container 3 at S3. When pressure P in the cooking container 3 reaches a predetermined value P1 by supplying the carbon dioxide at S4, the pressure electromagnetic valve 14 is closed to stop supplying the carbon dioxide at S5. After that, at S6 it is judged whether the pressure P is below a predetermined value P2 (wherein P1<P2). If it is below the predetermined value P2, it returns to S3 to open the pressure electromagnetic valve 14 for supplying the carbon dioxide. However, in the event that steam generated from moisture of foods increases because of a temperature rise along with heating, the value would not fall below the predetermined value P2 and pressure cooking is continued (S7).

Thereafter, the safety valve 16 is controlled to open/close in order to maintain the pressure P in the cooking container 3 within P2<P<P3 (wherein P2<P3) at S8. When the cooking program is terminated at S9, the safety valve 16 is opened for releasing the pressure from the cooking container 3. At the time of termination of pressure cooking, a buzzer sounds to notify the termination and then the lid is opened to bring out foods.

According to the above, in a fryer 1 according to the first embodiment, carbon dioxide is supplied so that pressure in the cooking container 3 surely and rapidly reaches the predetermined value P1. As a result, desirable pressure cooking can be carried out even if a small amount of food is cooked where the amount of steam generated from moisture of foods is small. Further, good cooking quality can be kept and deterioration of cooking oil can be prevented.

Moreover, pressure gas can be easily obtained or maintained since carbon dioxide is used as the same.

Moreover, the pressure sensor 17 detects pressure in the cooking container 3 to replenish a necessary amount of pressure from the high pressure cylinder 13. With this configuration, the carbon dioxide can be used efficiently.

Another embodiment of the present invention will be described below. A pressure fryer 1 of this embodiment has almost the same configuration as that of the first embodiment. The only difference between the two embodiments is that this embodiment does not have a pressure sensor. Therefore, an explanation for the same configuration is omitted and a flow chart of the pressure cooking control will be only used for explanation.

Second Embodiment

Figure 3:
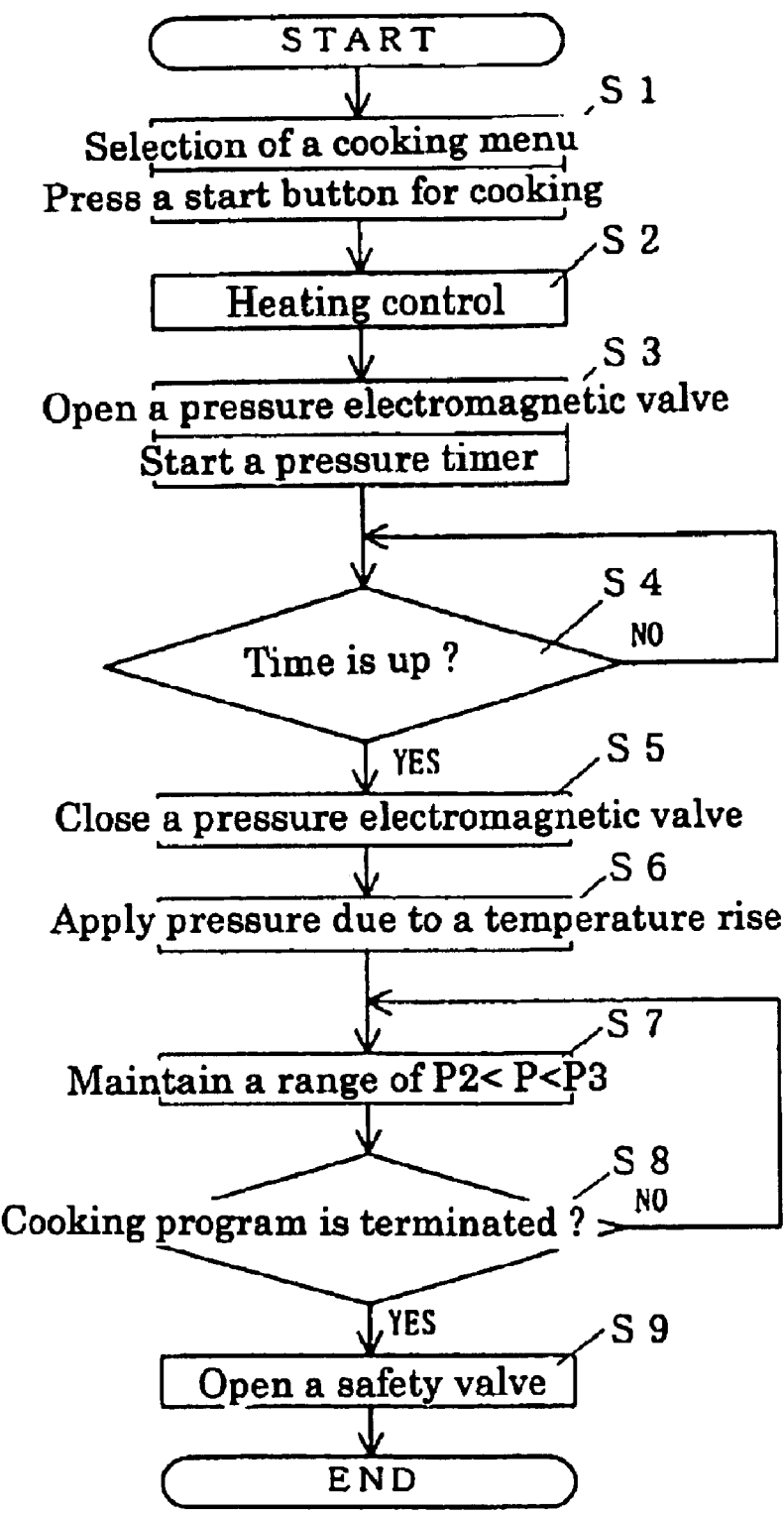
FIG. 3 is a flow chart of pressure cooking control of the second embodiment of the present invention.

In this embodiment, a time for opening a pressure electromagnetic valve 14 (that is, a pressure timer) is previously set in a controller 18 according to a cooking menu. For example, a pressure timer for a piece of fried chicken is set for 80 seconds, and as the number of the fried chicken increases by one piece, a pressure time is set to be shortened by 10 seconds. As shown in FIG. 3, a certain cooking menu is selected and a start button is pressed at S1. Then a burner 4 is ignited for starting heating control at S2. The pressure electromagnetic valve 14 is opened to supply carbon dioxide into the cooking controller 3 and a pressure timer set according to the cooking menu starts at S3. When the pressure timer is up at S4, the pressure electromagnetic valve 14 is closed to stop supplying the carbon dioxide at S5.

After that, pressure cooking is carried out further using steam generated from moisture of foods due to a temperature rise at S6. On this account, at S7 the safety valve 16 is controlled to open/close in order to maintain pressure P within P2<P<P3. When a cooking program is terminated at S8, the safety valve 16 is opened at S9 to terminate the pressure cooking.

Similarly, in the pressure fryer 1 of the second embodiment, carbon dioxide is supplied so that pressure in the cooking container 3 surely and rapidly reaches an appropriate value according to foods. As a result, desirable pressure cooking can be carried out even if a small amount of food is cooked where the amount of steam generated from moisture of foods is small. Further, good cooking quality can be kept and deterioration of cooking oil can be prevented.

Particularly, as a pressure timer set according to foods is used for pressure cooking in this embodiment, desirable pressure can be applied without using a pressure sensor. Therefore, desirable pressure cooking in a simpler configuration can be carried out using carbon dioxide efficiently.

Third Embodiment

Figure 4:
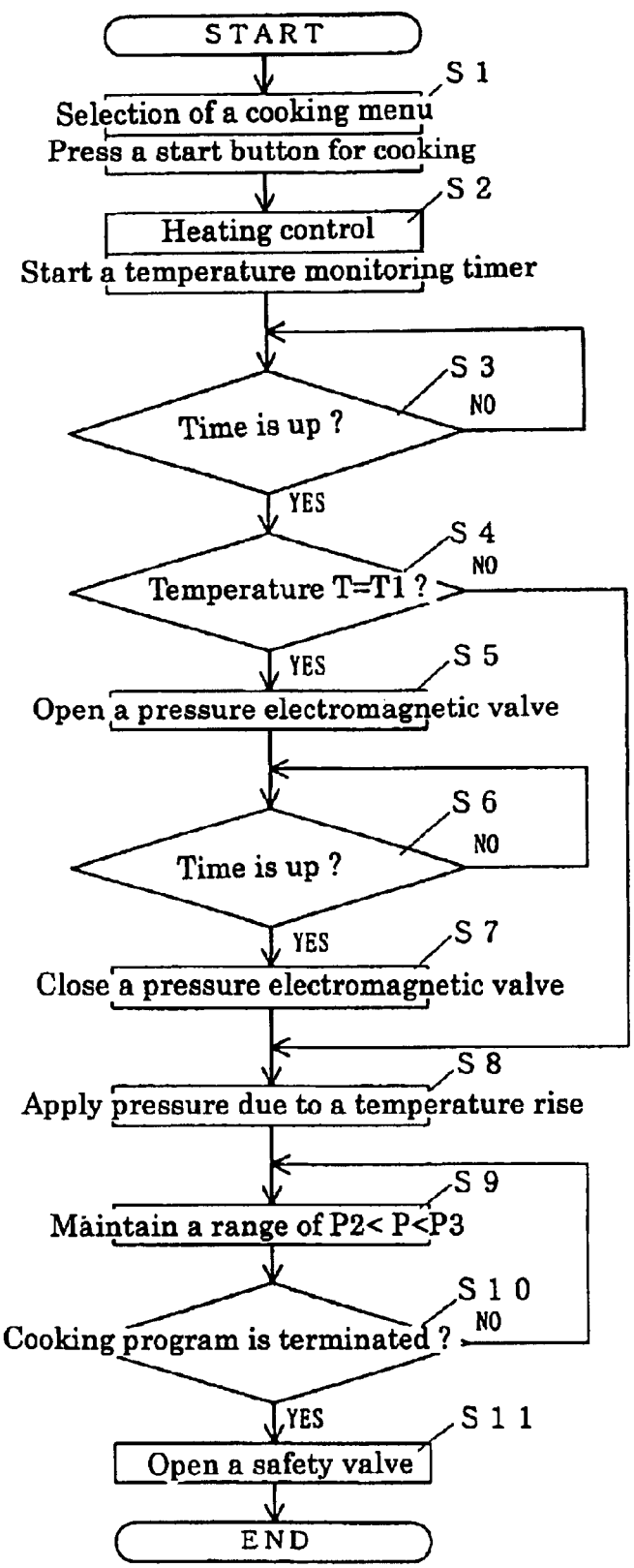
FIG. 4 is a flow chart of pressure cooking control of the third embodiment of the present invention.

In the embodiment described below, supply of carbon dioxide is selected according to cooking oil temperature obtained from the temperature sensor 11. As shown in FIG. 4, a certain cooking menu is selected and a start button is pressed at S1. Then a burner 4 is ignited for starting heating control at S2, and at the same time, a temperature monitoring timer set for a predetermined time starts counting. When the temperature monitoring timer is up at S3, it is judged whether or not a cooking oil temperature T reaches a predetermined temperature T1 at S4. It should be noted that the temperature T may be judged based on a rise gradient of temperature within a predetermined time.

If the cooking oil temperature reaches the predetermined temperature T1, it is judged that the amount of food is small, and the pressure electromagnetic valve 14 is opened at S5. While the valve is open, carbon dioxide is supplied into the cooking container 3 until a predetermined opening time is up (S6, S7), and it goes to S8. On the other hand, if the cooking oil temperature does not reach the predetermined temperature T1, it is judged that the amount of food is large, and then it goes to S8 without opening the pressure electromagnetic valve 14. After that, at S8 pressure cooking is carried out where steam generated from moisture of foods increases due to a temperature rise. On this account, at S9 the safety valve 16 is controlled to open/close in order to maintain pressure P within P2<P<P3. In other words, when the amount of food is large, pressure cooking is carried out only by steam generated from moisture of foods. When a cooking program is terminated at S10, the safety valve 16 is opened at S11 to terminate pressure cooking.

Similarly, in the pressure fryer 1 of the third embodiment, as carbon dioxide is supplied so that pressure in the cooking container 3 surely and rapidly reaches an appropriate value according to foods. As a result, desirable pressure cooking can be carried out even if a small amount of food is cooked where the amount of steam generated from moisture of foods is small. Further, good cooking quality can be kept and deterioration of cooking oil can be prevented.

Particularly, in this embodiment applying pressure by carbon dioxide is selected according to cooking oil temperature using the temperature sensor 11 which is originally provided. Therefore, desirable pressure cooking in a simple configuration using carbon dioxide efficiently can be carried out without a pressure sensor.

In the first to third embodiments, a high pressure cylinder is used as a gas supply means. However, other pressurizing means such as a compressor maybe used. Further, other than carbon dioxide, gas such as air or nitrogen may be used as pressure gas.

In the first embodiment, carbon dioxide is supplied according to a detected value of the pressure sensor. The way of supplying carbon dioxide is not limited to this, that is, carbon dioxide may be supplied according to a rise gradient of the detected value within a predetermined time as described in the third embodiment. Moreover, pressure gas may be supplied only when conditions set for both the detected value and the rise gradient are satisfied while they are monitored. In such a case under many conditions, applying pressure can be started in more appropriate timing. Likewise, in the third embodiment both a detected value of temperature and a rise gradient thereof may be monitored.

In addition, a pulse burner used as a heating means or a pressure fryer having a plurality of cooking containers are also applicable to the present invention.

According to a first aspect of the present invention, as pressure in the cooking container can be reached a necessary value surely and rapidly by adding pressure gas to steam generated from moisture of foods. As a result, desirable pressure cooking can be carried out even if a small amount of food is cooked where the amount of steam generated from moisture of foods is small. Further, good cooking quality can be kept and deterioration of cooking oil can be prevented.

According to a second aspect of the present invention, in addition to an advantageous effect of the first aspect, pressure gas which is easily obtained and maintained can be used since carbon dioxide is used as the same.

According to a third aspect of the present invention, in addition to advantageous effects of the first and second aspects, a pressure fryer comprises a pressure detecting means for detecting pressure in the cooking container. As a result, pressure gas supply is controlled according to a detected value by the pressure detecting means and/or a rise gradient of the detected value. Therefore, pressure gas can be used efficiently.

According to a fourth aspect of the present invention, in addition to the advantageous effects of the first and second aspects, the pressure fryer comprises a timer means for counting an elapsed time from a start of cooking. Moreover, a time for applying pressure is previously set according to each cooking menu and pressure gas is supplied with the cooking container for the preset pressuring time for the selected cooking menu. As a result, desirable pressure cooking in a simple configuration can be carried out using the pressure gas efficiently.

According to a fifth aspect of the present invention, in addition to the advantageous effects of the first and second aspects, pressure gas supply is controlled according to a detected value by a temperature detecting means and/or a rise gradient of the detected value. As a result, desirable pressure cooking in a simple configuration can be conducted using pressure gas efficiently.

What is claimed is:

1. A pressure fryer comprising:
    a cooking container for containing cooking oil capable of being hermetically sealed;
    a heating means for heating the cooking container;
    a control means for controlling the operation of the heating means;
    a temperature detecting means for detecting a temperature of the cooking oil, and
    a pressure adjusting means for adjusting pressure in the cooking container within a predetermined pressure,
    wherein pressure can be applied to the inside of the cooking container with steam generated during cooking,
    wherein a gas supply means for supplying pressure gas is provided in the cooking container, which enables pressure to be applied to the inside of the cooking container by supplying the pressure gas with the steam.

2. A pressure fryer according to claim 1, wherein the pressure gas is carbon dioxide.

3. A pressure fryer according to claim 1. wherein the pressure fryer further comprises a pressure detecting means for detecting pressure in the cooking container, and pressure gas supply is controlled according to a detected value by the pressure detecting means and/or a rise gradient of the detected value.

4. A pressure fryer according to claim 2, wherein the pressure fryer further comprises a pressure detecting means for detecting pressure in the cooking container, and pressure gas supply is controlled according to a detected value by the pressure detecting means and/or a rise gradient of the detected value.

5. A pressure fryer according to claim 1, wherein the pressure fryer further comprises a timer means for counting an elapsed time from a start of cooking, and an applying pressure time is previously set according to each cooking menu and pressure gas is supplied for the preset pressuring time for the selected cooking menu.

6. A pressure fryer according to claim 2, wherein the pressure fryer further comprises a timer means for counting an elapsed time from a start of cooking, and an applying pressure time is previously set according to each cooking menu and pressure gas is supplied for the preset pressuring time for the selected cooking menu.

7. A pressure fryer according to claim 1, wherein pressure gas supply is controlled according to a detected value by a temperature detecting means and/or a rise gradient of the detected value.

8. A pressure fryer according to claim 2, wherein pressure gas supply is controlled according to a detected value by a temperature detecting means and/or a rise gradient of the detected value.

* * * * *

UNITED STATES PATENT AND TRADEMARK OFFICE
CERTIFICATE OF CORRECTION

PATENT NO. : 6,935,223 B2
APPLICATION NO. : 10/753648
DATED : August 30, 2005
INVENTOR(S) : Toshihiro Kobayashi It is certified that error appears in the above-identified patent and that said Letters Patent is hereby corrected as shown below:

Title Page
    *Item (56) References Cited:* please add -- 4,968,516  11/1990  Thompson… 426/233--

*Item (57) Abstract:*  please delete the Abstract in its entirety and replace with the following rewritten Abstract:
-- A pressure fryer is provided including a cooking container having a pressure vent which is connected to a high pressure cylinder filled with carbon dioxide.  An electromagnetic valve and a check valve are provided on the connecting tube between the pressure vent and the high pressure cylinder.  A lid includes a safety valve and a pressure sensor.  A controller opens and closes the safety valve and the pressure for the electromagnetic valve for supplying carbon dioxide into the cooking container based on the pressure therein which is obtained from the pressure sensor, such that the pressure in the cooking container can be maintained within a predetermined value.--

Column 1
    *Line* 10:  please add --that is-- before "capable"
    *Line* 15:  please change "a fryer includes" to --fryers include--
    *Line* 16:  please delete "and" and add --,--
    *Line* 17:  please add --,-- after "container"
    *Line* 21:  please delete ". (For" and add --(see, for--
    *Line* 22:  please delete "please refer to"
    *Line* 23:  please add --.-- after "2002-223953A)"
    *Line* 25:  please add --that is-- before "capable"
    *Line* 26:  please add --is provided-- before "and" and add --that is-- before "vaporized"
    *Line* 27:  please delete "from" and add --by the--
    *Line* 28:  please delete ". Whereby, a" and add --, whereby the--
    *Line* 30:  please replace "applying" with --the application of--
    *Line* 31:  please add --that is-- after "steam" and add --the-- before "foods"
    *Line* 33: please add --only-- after "when" and replace "applying with --the application of--
    *Line* 35:  please add --the-- before "foods.", replace "Then, in" with --In--, and replace "replenish" with --compensate for--
    *Line* 36:  please add --a-- before "supply" and add --is applied-- before "by heating"
    *Line* 37:  please delete "is often applied"
    *Line* 39:  please replace "Owing" with --Due-- and add --the-- before "cooked"
    *Line* 40:  please add --,--after "steam", add --the-- before "cooking", and change "might boil suddenly" to --might suddenly boil--
    *Line* 41:  please change "infusion" to --that is infused--

UNITED STATES PATENT AND TRADEMARK OFFICE
CERTIFICATE OF CORRECTION

PATENT NO.       : 6,935,223 B2
APPLICATION NO.  : 10/753648
DATED            : August 30, 2005
INVENTOR(S)      : Toshihiro Kobayashi It is certified that error appears in the above-identified patent and that said Letters Patent is hereby corrected as shown below:

Column 1, cont'd
    *Line* 43:  please add --constantly-- before "conduct", replace "desirable" with --the desired--, and delete "constantly"
    *Line* 44:  please add --provided in the cooking container-- after "food"
    *Line* 48:  please add --according to-- before "a first"
    *Line* 49:  please delete "provides", add --,-- and add --is provided-- after "fryer"
    *Line* 51:  please replace ", which enable" with --to enable-- and delete the second instance of "to"
    *Line* 52:  please delete the first instance of "the" and delete "of"
    *Line* 55:  please delete "there is provided", add --is provided-- after "fryer" and add --the-- after "wherein"
    *Line* 58:  please replace "A" with --According to a-- and replace "provides" with --,--
    *Line* 59:  please add --is provided-- after "fryer"
    *Line* 60:  please add --The-- before second instance of "pressure"
    *Line* 61:  please replace "detected" with --pressure-- and add --detected-- after "value"
    *Line* 62:  please add --according to-- after "or"
    *Line* 65:  please replace "A" with --According to a-- and replace "provides" with --,--
    *Line* 66:  please add --is provided-- after "fryer"

Column 2
    *Line* 1:  please replace first instance of "an" with --the time--, delete "time", replace "a" with --the--, and replace second instance of "An" with --A present pressuring time for--
    *Line* 2:  please delete "time", delete "previously", and replace "each" with --a plurality of--
    *Line* 3:  please add --options-- after "menu" and replace "with" with --to--
    *Line* 4:  please replace second instance of "for" with --according to--
    *Line* 5:  please replace "desirable" with --the desired-- and delete "in a simple"
    Line 6:  please delete "configuration" and add --in a simple configuration-- after "out"
    *Line* 8:  please delete "there"
    *Line* 9:  please delete "is provided", add --is provided-- after "fryer", and add --the-- after "wherein"
    *Line* 10:  please replace "detected" with --temperature-- and add --detected-- after "value"
    *Line* 11: please add --according to-- after "or"

UNITED STATES PATENT AND TRADEMARK OFFICE
CERTIFICATE OF CORRECTION

PATENT NO. : 6,935,223 B2
APPLICATION NO. : 10/753648
DATED : August 30, 2005
INVENTOR(S) : Toshihiro Kobayashi It is certified that error appears in the above-identified patent and that said Letters Patent is hereby corrected as shown below:

Column 2 cont'd
*Line* 12: please replace "desirable" with --the desired-- and delete "in a simple configu-"
*Line* 13: please delete "ration" and add --in a simple configuration-- after "out"
*Line* 27: please replace "PREFERRED EMBODIMENTS" with --INVENTION--
*Line* 39: please replace ", wherein a" with --. A--
*Line* 43: please add --movable-- after "a" and add --,-- after "7"
*Line* 44: please add --,-- after "3" and replace "movably" with --to be capable of--
*Line* 45: please add --movement-- after "downward" replace "foods" with --food--
*Line* 46: please replace "hanged" with --positioned--, replace "sunk" with --submerged--, and replace "in" with --within--
*Line* 47: please replace "The reference" with --Reference--
*Line* 48: please replace "and" with --reference number--
*Line* 50: please add --reference number-- after "and"
*Line* 63: please replace "The reference" with --Reference--

Column 3
*Line* 1: please add --the-- after "controls"
*Line* 2: please add --mechanism-- after "closing"
*Line* 3: please add --,-- after "5" and add --the-- after second instance of "as"
*Line* 13: please replace "for starting" with --to start-- and replace "a" with --the--
*Line* 15: please replace "put" with --provided--
*Line* 16: please delete --,-- after "is"
*Line* 20: please add --the-- after "When"
*Line* 24: please add --,-- after "S6" and replace "judged" with --determined--
*Line* 25: please replace "it" with --the pressure P--
*Line* 26: please delete "it returns to S3 to open"
*Line* 27: please replace "for supplying" with --opens again to supply--
*Line* 28: please add --the-- after "from"
*Line* 29: please replace "foods" with --the food-- and replace "because of" with --due to--
*Line* 31: please replace "is continued" with --continues--
*Line* 36: please replace "for releasing" with --to release--
*Line* 37: please replace "At the time of termination of" with --When-- and add --is terminated-- after "cooking"
*Line* 38: please replace "notify" with --signify--
*Line* 39: please replace "bring out foods" with --access the food--
*Line* 54: please add --Second Embodiment-- before the paragraph beginning with "Another embodiment"

UNITED STATES PATENT AND TRADEMARK OFFICE
CERTIFICATE OF CORRECTION

PATENT NO. : 6,935,223 B2
APPLICATION NO. : 10/753648
DATED : August 30, 2005
INVENTOR(S) : Toshihiro Kobayashi It is certified that error appears in the above-identified patent and that said Letters Patent is hereby corrected as shown below:

Column 3, cont'd
    *Line* 57: please replace ". The" with --, with the-- and replace "between the two embodiments is" with --being--
    *Line* 59: please replace "an explanation for" with --explanations of-- and replace "is" with --are--
    *Line* 63: please delete "Second Embodiment"
    *Line* 65: please replace both instances of "a" with --the--

Column 4
    *Line* 1: please replace second instance of "a" with --the--
    *Line* 2: please add --pieces-- after "chicken"
    *Line* 3: please replace "a" with --the--
    *Line* 14: please add --,-- after "S7"
    *Line* 16: please replace "a" with --the--
    *Line* 19: please replace "of" with --according to--
    *Line* 27: please replace "a" with --the--
    *Line* 35: please add --the-- before "supply"
    *Lines* 42, 45, 48, 54: please replace "judged" with --determined--
    *Line* 56: please add --,-- after "S8"
    *Line* 58: please add --,-- after "S9"
    *Line* 65: please replace "of" with --according to--
    *Line* 66: please delete "as"

Column 5
    *Line* 1: please replace "foods" with --the food--
    *Line* 3: please replace "where" with --even when--
    *Line* 4: please replace "kept" with --maintained--
    *Line* 5: please add --the-- before "deterioration"
    *Line* 6: please replace "applying" with --, the-- and add --applied-- after "pressure"
    *Line* 18: please replace "way" with --means--
    *Line* 19: please replace "that is," with --however, and--
    *Line* 22: please add --the-- after "Moreover,"
    *Line* 25: please add --,-- after "case"
    *Line* 27: please add --,-- after "embodiment"
    *Line* 32: please replace "as" with --the desired--
    *Line* 33: please delete "a necessary"
    *Line* 34: please delete "value" and add --a-- after "adding"
    *Line* 37: please add --(-- after "cooked"
    *Line* 38: please add --)-- after "small"
    *Line* 39: please replace "kept" with --maintained--, delete "deterioration of", and add --deterioration-- after "oil"

UNITED STATES PATENT AND TRADEMARK OFFICE
CERTIFICATE OF CORRECTION

PATENT NO. : 6,935,223 B2
APPLICATION NO. : 10/753648
DATED : August 30, 2005
INVENTOR(S) : Toshihiro Kobayashi It is certified that error appears in the above-identified patent and that said Letters Patent is hereby corrected as shown below:

Column 5, cont'd
  *Line* 41: please add --since carbon dioxide is used as the-- after "aspect,"
  *Line* 42: Please add --,-- after "gas", replace "which" with --it--, and delete "can be used"
  *Line* 43: please delete "since carbon dioxide is used as the same"
  *Line* 46: please replace "a" with --the--
  *Line* 48: please add --the-- before "pressure"
  *Line* 49: please replace "detected" with --pressure-- and add --detected-- after "value"
  *Line* 50: please add --the-- before "pressure"
  *Line* 55: please replace "an" with --the time--, delete "time", add --cooking-- before "start", and replace "of cooking" with --time--
  *Line* 57: please add --a-- after "and" and replace "with" with --to--
  *Line* 60: please delete "in a simple configuration" and add --in a simple configuration-- after "carried out"

Column 6:
  *Line* 3: please add --the-- before "pressure"
  *Line* 4: please replace "detected" with --temperature-- and add --detected-- after "value"
  *Line* 6: please delete " in a simple configuration" and add --in a simple configuration-- after "conducted"
  *Line* 7: please add --the-- before "pressure"
  *Lines* 9-59: please delete claims 1-8 in their entirety and replace with the following rewritten claims 1-7
    --1. A pressure fryer comprising :
    a cooking container for containing cooking oil capable of being hermetically sealed;
    heating means for heating said cooking container;
    control means for controlling the operation of said heating means;
    temperature detecting means for detecting a temperature of the cooking oil;
    pressure gas supply means for supplying a pressure gas provided in said cooking container; and
    pressure adjusting means for adjusting the pressure in said cooking container within a predetermined pressure range;
    wherein pressure is applied inside said cooking container by steam generated during cooking and by supplying said pressure gas with the steam; and
    wherein said pressure gas is carbon dioxide.

UNITED STATES PATENT AND TRADEMARK OFFICE
CERTIFICATE OF CORRECTION

| | |
|---|---|
| PATENT NO. | : 6,935,223 B2 |
| APPLICATION NO. | : 10/753648 |
| DATED | : August 30, 2005 |
| INVENTOR(S) | : Toshihiro Kobayashi |

It is certified that error appears in the above-identified patent and that said Letters Patent is hereby corrected as shown below:

Column 6, cont'd

2. A pressure fryer comprising:
   a cooking container for containing cooking oil capable of being hermetically sealed;
   heating means for heating said cooking container;
   control means for controlling the operation of said heating means;
   termperature detecting means for detecting a temperature of the cooking oil;
   pressure adjusting means for adjusting the pressure in said cooking container within a predetermined pressure range;
   pressure gas supply means for supplying a pressure gas provided in said cooking container; and
   pressure detecting means for detecting pressure in said cooking container ;
   wherein pressure is applied inside said cooking container by steam generated during cooking and by supplying said pressure gas with the steam; and
   wherein said pressure gas supply is controlled according to at least one of a pressure value detected by said pressure detecting means and/ a rise gradient of said detected pressure value.

3. The pressure fryer according to claim 2, wherein said pressure fryer further comprises pressure detecting means for detecting pressure in the cooking container, and wherein said pressure gas supply is controlled according to a pressure value detected by said pressure detecting means and/ at least one of a rise gradient of said detected pressure value.

4. A pressure fryer comprising:
   a cooking container for containing cooking oil capable of being hermetically sealed;
   heating means for heating said cooking container;
   control means for controlling the operation of said heating means;
   tempereature detecting means for detecting a temperature of the cooking oil;
   pressure adjusting means for adjusting the pressure in said cooking container within a predetermined pressure range;
   pressure gas supply means for supplying a pressure gas provided in said cooking container; and
   timer means for counting time elapsed from a cooking start time and a preset pressuring time for applying pressure that is previously set according to a plurality of preset cooking menu options
   wherein pressure is applied inside said cooking container by steam generated during cooking and by supplying said pressure gas with the steam; and
   wherein said pressure gas is supplied for said preset pressuring time according to a selected cooking menu.

UNITED STATES PATENT AND TRADEMARK OFFICE
CERTIFICATE OF CORRECTION

PATENT NO. : 6,935,223 B2
APPLICATION NO. : 10/753648
DATED : August 30, 2005
INVENTOR(S) : Toshihiro Kobayashi It is certified that error appears in the above-identified patent and that said Letters Patent is hereby corrected as shown below:

Column 6, cont'd
5. The pressure fry according to claim 2, wherein said pressure fryer further comprises timer means for counting time elapsed from cooking start time and a preset pressuring time for applying pressure that is previously set according to a plurality of preset cooking menu options, wherein said pressure gas is supplied for said preset pressuring time according to a selected cooking menu.

6. A pressure fryer comprising:
   a cooking container for containing cooking oil capable of being hermetically sealed;
   heating means for heating said cooking container;
   control means for controlling the operation of said heating means;
   temperature detecting means for detecting a temperature of the cooking oil;
   pressure adjusting means for adjusting the pressure in said cooking container within a predetermined pressure range; and
   pressure gas suupply means for supplying a pressure gas is provided in said cooking container;
   wherein pressure is applied inside said cooking container by steam generated during cooking and by supplying said pressure gas with the steam; and
   wherein said pressure gas supply is controlled according to at least one of a temperature value detected by said temperature detecting means and a rise gradient of said detected temperature value 7. The pressure fryer according to claim 2, wherein said pressure gas supply is controlled according to at least on of a temperature value detected by said temperature detecting means and a rise gradient of said detected temperature value.--

Signed and Sealed this

Fifteenth Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,935,223 B2
APPLICATION NO. : 10/753648
DATED : August 30, 2005
INVENTOR(S) : Toshihiro Kobayashi It is certified that error appears in the above-identified patent and that said Letters Patent is hereby corrected as shown below:

Title Page
*Item (56) References Cited:* please add -- 4,968,516   11/1990   Thompson… 426/233--

*Item (57) Abstract:* please delete the Abstract in its entirety and replace with the following rewritten Abstract:
-- A pressure fryer is provided including a cooking container having a pressure vent which is connected to a high pressure cylinder filled with carbon dioxide. An electromagnetic valve and a check valve are provided on the connecting tube between the pressure vent and the high pressure cylinder. A lid includes a safety valve and a pressure sensor. A controller opens and closes the safety valve and the pressure for the electromagnetic valve for supplying carbon dioxide into the cooking container based on the pressure therein which is obtained from the pressure sensor, such that the pressure in the cooking container can be maintained within a predetermined value.--

Column 1
*Line* 10: please add --that is-- before "capable"
*Line* 15: please change "a fryer includes" to --fryers include--
*Line* 16: please delete "and" and add --,--
*Line* 17: please add --,-- after "container"
*Line* 21: please delete ". (For" and add --(see, for--
*Line* 22: please delete "please refer to"
*Line* 23: please add --.-- after "2002-223953A)"
*Line* 25: please add --that is-- before "capable"
*Line* 26: please add --is provided-- before "and" and add --that is-- before "vaporized"
*Line* 27: please delete "from" and add --by the--
*Line* 28: please delete ". Whereby, a" and add --, whereby the--
*Line* 30: please replace "applying" with --the application of--
*Line* 31: please add --that is-- after "steam" and add --the-- before "foods"
*Line* 33: please add --only-- after "when" and replace "applying with --the application of--
*Line* 35: please add --the-- before "foods.", replace "Then, in" with --In--, and replace "replenish" with --compensate for--
*Line* 36: please add --a-- before "supply" and add --is applied-- before "by heating"
*Line* 37: please delete "is often applied"
*Line* 39: please replace "Owing" with --Due-- and add --the-- before "cooked"
*Line* 40: please add --,--after "steam", add --the-- before "cooking", and change "might boil suddenly" to --might suddenly boil--
*Line* 41: please change "infusion" to --that is infused--

UNITED STATES PATENT AND TRADEMARK OFFICE
CERTIFICATE OF CORRECTION

PATENT NO.       : 6,935,223 B2
APPLICATION NO.  : 10/753648
DATED            : August 30, 2005
INVENTOR(S)      : Toshihiro Kobayashi It is certified that error appears in the above-identified patent and that said Letters Patent is hereby corrected as shown below:

Column 1, cont'd
*Line* 43: please add --constantly-- before "conduct", replace "desirable" with --the desired--, and delete "constantly"
*Line* 44: please add --provided in the cooking container-- after "food"
*Line* 48: please add --according to-- before "a first"
*Line* 49: please delete "provides", add --,-- and add --is provided-- after "fryer"
*Line* 51: please replace ", which enable" with --to enable-- and delete the second instance of "to"
*Line* 52: please delete the first instance of "the" and delete "of"
*Line* 55: please delete "there is provided", add --is provided-- after "fryer" and add --the-- after "wherein"
*Line* 58: please replace "A" with --According to a-- and replace "provides" with --,--
*Line* 59: please add --is provided-- after "fryer"
*Line* 60: please add --The-- before second instance of "pressure"
*Line* 61: please replace "detected" with --pressure-- and add --detected-- after "value"
*Line* 62: please add --according to-- after "or"
*Line* 65: please replace "A" with --According to a-- and replace "provides" with --,--
*Line* 66: please add --is provided-- after "fryer"

Column 2
*Line* 1: please replace first instance of "an" with --the time--, delete "time", replace "a" with --the--, and replace second instance of "An" with --A preset pressuring time for--
*Line* 2: please delete "time", delete "previously", and replace "each" with --a plurality of--
*Line* 3: please add --options-- after "menu" and replace "with" with --to--
*Line* 4: please replace second instance of "for" with --according to--
*Line* 5: please replace "desirable" with --the desired-- and delete "in a simple"
Line 6: please delete "configuration" and add --in a simple configuration-- after "out"
*Line* 8: please delete "there"
*Line* 9: please delete "is provided", add --is provided-- after "fryer", and add --the-- after "wherein"
*Line* 10: please replace "detected" with --temperature-- and add --detected-- after "value"
*Line* 11: please add --according to-- after "or"

UNITED STATES PATENT AND TRADEMARK OFFICE
CERTIFICATE OF CORRECTION

PATENT NO. : 6,935,223 B2
APPLICATION NO. : 10/753648
DATED : August 30, 2005
INVENTOR(S) : Toshihiro Kobayashi It is certified that error appears in the above-identified patent and that said Letters Patent is hereby corrected as shown below:

Column 2 cont'd
*Line* 12: please replace "desirable" with --the desired-- and delete "in a simple configu-"
*Line* 13: please delete "ration" and add --in a simple configuration-- after "out"
*Line* 27: please replace "PREFERRED EMBODIMENTS" with --INVENTION--
*Line* 39: please replace ", wherein a" with --. A--
*Line* 43: please add --movable-- after "a" and add --,-- after "7"
*Line* 44: please add --,-- after "3" and replace "movably" with --to be capable of--
*Line* 45: please add --movement-- after "downward" replace "foods" with --food--
*Line* 46: please replace "hanged" with --positioned--, replace "sunk" with --submerged--, and replace "in" with --within--
*Line* 47: please replace "The reference" with --Reference--
*Line* 48: please replace "and" with --reference number--
*Line* 50: please add --reference number-- after "and"
*Line* 63: please replace "The reference" with --Reference--

Column 3
*Line* 1: please add --the-- after "controls"
*Line* 2: please add --mechanism-- after "closing"
*Line* 3: please add --,-- after "5" and add --the-- after second instance of "as"
*Line* 13: please replace "for starting" with --to start-- and replace "a" with --the--
*Line* 15: please replace "put" with --provided--
*Line* 16: please delete --,-- after "is"
*Line* 20: please add --the-- after "When"
*Line* 24: please add --,-- after "S6" and replace "judged" with --determined--
*Line* 25: please replace "it" with --the pressure P--
*Line* 26: please delete "it returns to S3 to open"
*Line* 27: please replace "for supplying" with --opens again to supply--
*Line* 28: please add --the-- after "from"
*Line* 29: please replace "foods" with --the food-- and replace "because of" with --due to--
*Line* 31: please replace "is continued" with --continues--
*Line* 36: please replace "for releasing" with --to release--
*Line* 37: please replace "At the time of termination of" with --When-- and add --is terminated-- after "cooking"
*Line* 38: please replace "notify" with --signify--
*Line* 39: please replace "bring out foods" with --access the food--
*Line* 54: please add --Second Embodiment-- before the paragraph beginning with "Another embodiment"

UNITED STATES PATENT AND TRADEMARK OFFICE
CERTIFICATE OF CORRECTION

PATENT NO. : 6,935,223 B2
APPLICATION NO. : 10/753648
DATED : August 30, 2005
INVENTOR(S) : Toshihiro Kobayashi It is certified that error appears in the above-identified patent and that said Letters Patent is hereby corrected as shown below:

Column 3, cont'd
*Line* 57: please replace ". The" with --, with the-- and replace "between the two embodiments is" with --being--
*Line* 59: please replace "an explanation for" with --explanations of-- and replace "is" with --are--
*Line* 63: please delete "Second Embodiment"
*Line* 65: please replace both instances of "a" with --the--

Column 4
*Line* 1: please replace second instance of "a" with --the--
*Line* 2: please add --pieces-- after "chicken"
*Line* 3: please replace "a" with --the--
*Line* 14: please add --,-- after "S7"
*Line* 16: please replace "a" with --the--
*Line* 19: please replace "of" with --according to--
*Line* 27: please replace "a" with --the--
*Line* 35: please add --the-- before "supply"
*Lines* 42, 45, 48, 54: please replace "judged" with --determined--
*Line* 56: please add --,-- after "S8"
*Line* 58: please add --,-- after "S9"
*Line* 65: please replace "of" with --according to--
*Line* 66: please delete "as"

Column 5
*Line* 1: please replace "foods" with --the food--
*Line* 3: please replace "where" with --even when--
*Line* 4: please replace "kept" with --maintained--
*Line* 5: please add --the-- before "deterioration"
*Line* 6: please replace "applying" with --, the-- and add --applied-- after "pressure"
*Line* 18: please replace "way" with --means--
*Line* 19: please replace "that is," with --however, and--
*Line* 22: please add --the-- after "Moreover,"
*Line* 25: please add --,-- after "case"
*Line* 27: please add --,-- after "embodiment"
*Line* 32: please replace "as" with --the desired--
*Line* 33: please delete "a necessary"
*Line* 34: please delete "value" and add --a-- after "adding"
*Line* 37: please add --(-- after "cooked"
*Line* 38: please add --)-- after "small"
*Line* 39: please replace "kept" with --maintained--, delete "deterioration of", and add --deterioration-- after "oil"

UNITED STATES PATENT AND TRADEMARK OFFICE
CERTIFICATE OF CORRECTION

PATENT NO. : 6,935,223 B2
APPLICATION NO. : 10/753648
DATED : August 30, 2005
INVENTOR(S) : Toshihiro Kobayashi It is certified that error appears in the above-identified patent and that said Letters Patent is hereby corrected as shown below:

Column 5, cont'd

*Line* 41: please add --since carbon dioxide is used as the-- after "aspect,"
*Line* 42: Please add --,-- after "gas", replace "which" with --it--, and delete "can be used"
*Line* 43: please delete "since carbon dioxide is used as the same"
*Line* 46: please replace "a" with --the--
*Line* 48: please add --the-- before "pressure"
*Line* 49: please replace "detected" with --pressure-- and add --detected-- after "value"
*Line* 50: please add --the-- before "pressure"
*Line* 55: please replace "an" with --the time--, delete "time", add --cooking-- before "start", and replace "of cooking" with --time--
*Line* 57: please add --a-- after "and" and replace "with" with --to--
*Line* 60: please delete "in a simple configuration" and add --in a simple configuration-- after "carried out"

Column 6:

*Line* 3: please add --the-- before "pressure"
*Line* 4: please replace "detected" with --temperature-- and add --detected-- after "value"
*Line* 6: please delete " in a simple configuration" and add --in a simple configuration-- after "conducted"
*Line* 7: please add --the-- before "pressure"
*Lines* 9-59: please delete claims 1-8 in their entirety and replace with the following rewritten claims 1-7

--1. A pressure fryer comprising :
a cooking container for containing cooking oil capable of being hermetically sealed;
heating means for heating said cooking container;
control means for controlling the operation of said heating means;
temperature detecting means for detecting a temperature of the cooking oil;
pressure gas supply means for supplying a pressure gas provided in said cooking container; and
pressure adjusting means for adjusting the pressure in said cooking container within a predetermined pressure range;
wherein pressure is applied inside said cooking container by steam generated during cooking and by supplying said pressure gas with the steam; and
wherein said pressure gas is carbon dioxide.

UNITED STATES PATENT AND TRADEMARK OFFICE
CERTIFICATE OF CORRECTION

| | | |
|---|---|---|
| PATENT NO. | : 6,935,223 B2 | |
| APPLICATION NO. | : 10/753648 | |
| DATED | : August 30, 2005 | |
| INVENTOR(S) | : Toshihiro Kobayashi | |

It is certified that error appears in the above-identified patent and that said Letters Patent is hereby corrected as shown below:

Column 6, cont'd

2. A pressure fryer comprising:
    a cooking container for containing cooking oil capable of being hermetically sealed;
    heating means for heating said cooking container;
    control means for controlling the operation of said heating means;
    temperature detecting means for detecting a temperature of the cooking oil;
    pressure adjusting means for adjusting the pressure in said cooking container within a predetermined pressure range;
    pressure gas supply means for supplying a pressure gas provided in said cooking container; and
    pressure detecting means for detecting pressure in said cooking container ;
    wherein pressure is applied inside said cooking container by steam generated during cooking and by supplying said pressure gas with the steam; and
    wherein said pressure gas supply is controlled according to at least one of a pressure value detected by said pressure detecting means and/ a rise gradient of said detected pressure value.

3. The pressure fryer according to claim 2, wherein said pressure fryer further comprises pressure detecting means for detecting pressure in the cooking container, and wherein said pressure gas supply is controlled according to a pressure value detected by said pressure detecting means and/ at least one of a rise gradient of said detected pressure value.

4. A pressure fryer comprising:
    a cooking container for containing cooking oil capable of being hermetically sealed;
    heating means for heating said cooking container;
    control means for controlling the operation of said heating means;
    tempereature detecting means for detecting a temperature of the cooking oil;
    pressure adjusting means for adjusting the pressure in said cooking container within a predetermined pressure range;
    pressure gas supply means for supplying a pressure gas provided in said cooking container; and
    timer means for counting time elapsed from a cooking start time and a preset pressuring time for applying pressure that is previously set according to a plurality of preset cooking menu options
    wherein pressure is applied inside said cooking container by steam generated during cooking and by supplying said pressure gas with the steam; and
    wherein said pressure gas is supplied for said preset pressuring time according to a selected cooking menu.

UNITED STATES PATENT AND TRADEMARK OFFICE
CERTIFICATE OF CORRECTION

PATENT NO. : 6,935,223 B2
APPLICATION NO. : 10/753648
DATED : August 30, 2005
INVENTOR(S) : Toshihiro Kobayashi It is certified that error appears in the above-identified patent and that said Letters Patent is hereby corrected as shown below:

Column 6, cont'd
5. The pressure fryer according to claim 2, wherein said pressure fryer further comprises timer means for counting time elapsed from a cooking start time and a preset pressuring time for applying pressure that is previously set according to a plurality of preset cooking menu options, wherein said pressure gas is supplied for said preset pressuring time according to a selected cooking menu.

6. A pressure fryer comprising:
   a cooking container for containing cooking oil capable of being hermetically sealed;
   heating means for heating said cooking container;
   control means for controlling the operation of said heating means;
   temperature detecting means for detecting a temperature of the cooking oil;
   pressure adjusting means for adjusting the pressure in said cooking container within a predetermined pressure range; and
   pressure gas supply means for supplying a pressure gas is provided in said cooking container;
   wherein pressure is applied inside said cooking container by steam generated during cooking and by supplying said pressure gas with the steam; and
   wherein said pressure gas supply is controlled according to at least one of a temperature value detected by said temperature detecting means and a rise gradient of said detected temperature value 7. The pressure fryer according to claim 2, wherein said pressure gas supply is controlled according to at least one of a temperature value detected by said temperature detecting means and a rise gradient of said detected temperature value.--

This certificate supersedes Certificate of Correction issued August 15, 2006.

Signed and Sealed this

Sixth Day of March, 2007

JON W. DUDAS
*Director of the United States Patent and Trademark Office*